(12) United States Patent
Sempolinski et al.

(10) Patent No.: US 6,260,385 B1
(45) Date of Patent: Jul. 17, 2001

(54) METHOD AND BURNER FOR FORMING SILICA-CONTAINING SOOT

(75) Inventors: Daniel R. Sempolinski, Painted Post; Michael H. Wasilewski, Corning; C. Charles Yu, Painted Post, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/292,260

(22) Filed: Apr. 15, 1999

Related U.S. Application Data

(60) Provisional application No. 60/095,742, filed on Aug. 7, 1998.

(51) Int. Cl.[7] .............................. C03B 19/14; C03B 20/00
(52) U.S. Cl. ............................ 65/17.4; 65/414; 65/416; 65/421; 65/531; 65/DIG. 8
(58) Field of Search ........................... 65/17.4, 414, 416, 65/421, 531, DIG. 8

(56) References Cited

U.S. PATENT DOCUMENTS

| | | | |
|---|---|---|---|
| 4,165,223 | 8/1979 | Powers | 65/2 |
| 4,173,305 | 11/1979 | Blankenship | 239/79 |
| 4,230,744 | 10/1980 | Blankenship | 427/163 |
| 5,043,002 | 8/1991 | Dobbins et al. | 65/3.12 |
| 5,110,335 | 5/1992 | Miller et al. | 65/3.12 |
| 5,152,819 | 10/1992 | Blackwell et al. | 65/3.12 |
| 5,622,750 | * 4/1997 | Kilian et al. | 427/163.2 |
| 5,788,730 | * 8/1998 | Ruppert et al. | 65/17.4 |
| 5,979,185 | * 11/1999 | Blackwell et al. | 65/17.4 |
| 6,075,101 | * 6/2000 | Lynn et al. | 526/86 |
| 6,079,225 | * 6/2000 | Ruppert et al. | 65/17.2 |

FOREIGN PATENT DOCUMENTS 97 22553   6/1997 (WO).

OTHER PUBLICATIONS

Patent Abstracts of Japan, vol. 6, No. 35, Mar. 3, 1982—& JP 56 155034 (NT&T Corp.) Dec. 1, 1981, abstract.
Patent Abstracts of Japan, vol. 5, No. 54, Apr. 15, 1981—& JP 56 005337 (Hitachi Ltd. et al.), Jan. 20, 1981, abstract.
Patent Abstracts of Japan, vol. 16, No. 176, Apr. 27, 1992—& JP 04 021536 (Hitachi Cable Ltd.) Jan. 24, 1992, abstract.
Morse T.F. et al. "Aerosol Techniques For Fiber Core Doping" Proceedings of the Optical Fiber Communication Conference, US, New York, IEEE, vol. Conf. 14, p. 63. (2–1991).
Patent Abstracts of Japn, vol. 5, No. 62, Apr. 25, 1981—& JP 56 014438 (Hitachi Ltd. et al.) Feb. 12, 1981.
"Atomization and Sprays," Lefebvre, Arthur H., pp 142–145, Hemisphere Publishing Corp, 1989. (No month available).

\* cited by examiner

*Primary Examiner*—Sean Vincent
(74) *Attorney, Agent, or Firm*—Milton M. Peterson

(57) ABSTRACT

A method and a burner for manufacturing silica-containing soot is disclosed. The method includes providing a liquid silicon-containing feedstock and a gas mixture and ejecting the liquid-gas mixture from an orifice into a combustion site to convert the silica-containing feedstock into silica containing soot. The burner includes a plurality of channels for delivering a gas to provide a flame, an effervescent atomizer for atomizing a liquid, silicon-containing feedstock and a rail for guiding the atomized liquid, silicon-containing feedstock into the burner flame. The method and burner can be used to produce silica-containing articles such as high purity fused silica optical members and waveguides.

14 Claims, 5 Drawing Sheets

METHOD AND BURNER FOR FORMING SILICA-CONTAINING SOOT

This application claims benefit to U.S. provisional application Ser. No. 60/095,742, filed Aug. 7, 1998.

FIELD OF THE INVENTION

The present invention relates to the formation of silica-containing soot and articles made from silica-containing soot and, more particularly, to a method and a burner for forming silica-containing soot and articles from liquid silicon-containing compounds.

BACKGROUND OF THE INVENTION

Various processes are known to produce metal oxide soot through the use of burners. The soot can be the end-product itself, or it can be collected on a target to form a porous pre-sintered body which can be subsequently consolidated into a dense body. Alternatively, the soot collected on the target can be simultaneously heat treated to form a dense body. The majority of processes in practice today feed reactants to the burner in vaporous form, which require sophisticated vaporizing and delivering systems. The complexity of the equipment and process control increases substantially when the end products are multicomponent systems, which require separate feed for individual reactants.

Silicon, germanium, zirconium, and titanium metal halides are often used as vaporous reactants in forming metal oxide glasses. For example, hydrolysis of $SiCl_4$ has been the industry preference for producing high purity silica over the years. The conversion of $SiCl_4$ into $SiO_2$, through pyrolysis and hydrolysis, however, has the disadvantage of producing chlorine or a very strong acid by-product, hydrochloric acid (HCl). Hydrochloric acid is not only detrimental to many deposition substrates and reaction equipment, but also harmful to the environment. Emission abatement systems have proven to be very expensive due to loss and maintenance of equipment caused by the corrosiveness of HCl. As an alternative, high purity quartz or silica has also been produced by thermal decomposition and oxidation of silanes. However, this requires taking safety measures to prevent the violent reaction that results from the introduction of air into a closed container of silanes. Silanes react with carbon dioxide, nitrous oxide, oxygen, or water to produce high purity materials that are potentially useful in producing, among other things, semiconductor devices. However, silanes are much too expensive and reactive to be considered for commercial production of fused silica except possibly for small scale applications requiring extremely high purity.

U.S. Pat. No. 5,043,002 to Dobbins et al., which is relied upon and incorporated by reference, proposed alternative silica precursor materials. This patent disclosed bubbling a carrier gas through a silicon-containing reactant compound, preferably a halide-free compound such as polymethylsiloxanes, in particular, polymethylcyclosiloxanes such as hexamethylcyclotrisiloxane, octamethylcyclotetrasiloxane ("OMCTS"), and decamethylcyclopentasiloxane. A mixture of the reactant compound vapor and nitrogen is transported to the burner at the reaction site, where the reactant is combined with a gaseous fuel/oxygen mixture and combusted. U.S. Pat. No. 5,152,819 to Blackwell et al., the disclosure of which is relied upon and incorporated by reference, describes additional halide-free silicon compounds, in particular, organosilicon-nitrogen compounds having a basic Si—N—Si structure, siloxasilazones having a basic Si—N—Si—O—Si structure, and mixtures thereof, which may be used to produce high purity silica glass without the concomitant generation of corrosive, polluting by-products.

Although the use of halide-free silicon compounds as feedstocks for silica glass production avoids the formation of HCl, some problems remain, particularly when the glass is intended for the formation of high purity bulk fused silica and high quality optical products such as optical waveguides. For example, as disclosed in copending U.S. patent application Ser. No. 08/574,961 entitled "Method for Purifying Polyalkylsiloxanes and the Resulting Products," which is relied upon and incorporated by reference, the presence of high boiling point impurities in, for example, a polyalkylsiloxane feedstock, can result in the formation of gel deposits in the vaporization and delivery systems carrying the vaporous reactants to the burner or within the burner itself. Such polymerizing and gelling of the siloxane feedstock inhibits the controllability and consistency of the silica manufacturing process. This problem is more prevalent when an oxidizing carrier gas such as oxygen is included in the reactant vapor stream, because oxidizers appear to catalyze polymerization of the siloxane feedstock. Such polymerizing and gelling reduces the deposition lay-down rate of the bulk silica soot or soot preform that may be either simultaneously consolidated to form optical members or subsequently consolidated to a blank from which an optical waveguide is fabricated.

An additional problem encountered when silica soot or silica preforms are formed using siloxane feedstocks is that particulates of the high molecular weight, high boiling point impurities may be deposited in the bulk silica soot or collection site, resulting in "defect" or "clustered defect." Defects or clustered defects are imperfections that adversely affect the optical and structural quality of the optical waveguides formed using the silica soot.

Application Ser. No. 08/767,653, the content of which is relied upon and incorporated by reference, discloses that the clustered defects can be reduced by delivering a liquid siloxane feedstock to a conversion site, atomizing the feedstock at the conversion site, and converting the atomized feedstock at the conversion site into silica. One way to atomize the feedstock at the conversion site involves pneumatically or "airblast" atomizing the liquid siloxane feedstock by delivering the liquid feedstock to the conversion site with an inert gas.

Direct liquid feed to the burner offers many additional advantages such as simplified equipment construction, ease in system operation, reduced production cost, and importantly, capability of producing multicomponent oxide materials with compositions difficult to achieve with the vapor feed burner system.

The challenges for the liquid feed burner design are increasing effectiveness of liquid atomization and reducing turbulence of the flame. For processes such as high purity fused silica lay-down and optical waveguide soot preform formation, the requirements for high deposition rate and uniformity imposes even more strict demand for flame control.

Although atomizing the liquid siloxane feedstock proximate the conversion site using an airblast atomizer reduces clustered defects, such airblast atomization systems presents several further challenges. For example, increasing the atomizing gas velocity desirably produces smaller liquid droplets, which are more readily vaporized and burned in the burner flame. Smaller droplets are desirable because larger droplets cause wart-like defects ("warts") on the surface of the deposition site. In addition, smaller droplets can be more easily focused with the surrounding gases to produce a more concentrated deposition stream. On the other hand, increasing atomizing gas velocity adds turbulence to the burner flame, which reduces the soot capture rate and can cause other physical defects in the final silica-containing articles made from the soot.

U.S. Pat. No. 5,110,335 to Miller et al. discloses a liquid feed burner using ultrasonic atomizing nozzle. Although liquid atomization by ultrasound can be effective, incorporating an ultrasonic nozzle makes the burner costly and its construction complex. The high temperature environment of certain applications such as the glass manufacturing process may drastically reduce the life of the ultrasound nozzle. In addition, compact burner design is difficult to achieve.

Accordingly, it would be desirable to provide a burner and a method incorporating a liquid delivery system that produces a focused, silica-containing soot deposition stream containing small droplets without the need for high gas velocity. Such a burner and method would desirably provide low burner flame turbulence.

SUMMARY OF THE INVENTION

Accordingly, the present invention generally provides a method and a burner for manufacturing silica-containing soot. The method and burner are particularly useful for manufacturing high purity fused silica members and waveguide blanks.

The method comprises mixing a liquid, silicon-containing feedstock and a gas in a mixing chamber to provide a liquid-gas mixture, ejecting the liquid-gas mixture from an orifice into a combustion site and converting the silica-containing feedstock into a silica-containing soot proximate the combustion site. In a preferred embodiment, the liquid feedstock is atomized during the step of ejecting the feedstock from the orifice and a guiding rail is provided to direct the atomized liquid-gas mixture into the combustion site. In one embodiment, the silica-containing soot contains a dopant. The method of the present invention can be used to manufacture optical members. In one embodiment, the method further comprises depositing and simultaneously sintering the silica-containing soot in a containment vessel to form a silica-containing body. In another embodiment, the soot can be deposited onto a rotating mandrel to form an optical waveguide fiber preform.

The invention also includes a burner for producing a silica containing soot comprising a plurality of channels for delivering gas to provide a flame, an effervescent atomizer for atomizing a liquid, silicon-containing feedstock, and a rail for guiding the atomized liquid, silicon-containing feedstock into the burner flame. In a preferred embodiment, the effervescent atomizer comprises a gas inlet for receiving a gas supply, a liquid inlet for receiving the liquid, silicon-containing feedstock and a mixing chamber for mixing the feedstock and gas to provide a liquid-gas mixture. The atomizer also comprises an orifice for ejecting the liquid gas mixture.

The method and burner of the present invention provides several advantages over other liquid delivery, atomizing burners. One advantage is a burner and a method utilizing effervescent atomization, as opposed to airblast atomization, provides a less turbulent flame, which enhances soot quality during laydown of the soot. An effervescent atomizer can utilize larger orifices than airblast atomizers, allowing for easier fabrication of the burner. Larger orifices are less prone to clog during the laydown process.

It is to be understood that both the foregoing general description and the following detailed description are exemplary and explanatory and are intended to provide further explanation of the invention as claimed.

The accompanying drawings are included to provide a further understanding of the invention illustrate exemplary embodiments of the invention. Wherever possible, the same reference characters will be used throughout the drawings to denote similar elements.

DETAILED DESCRIPTION OF THE INVENTION

Figure 1:
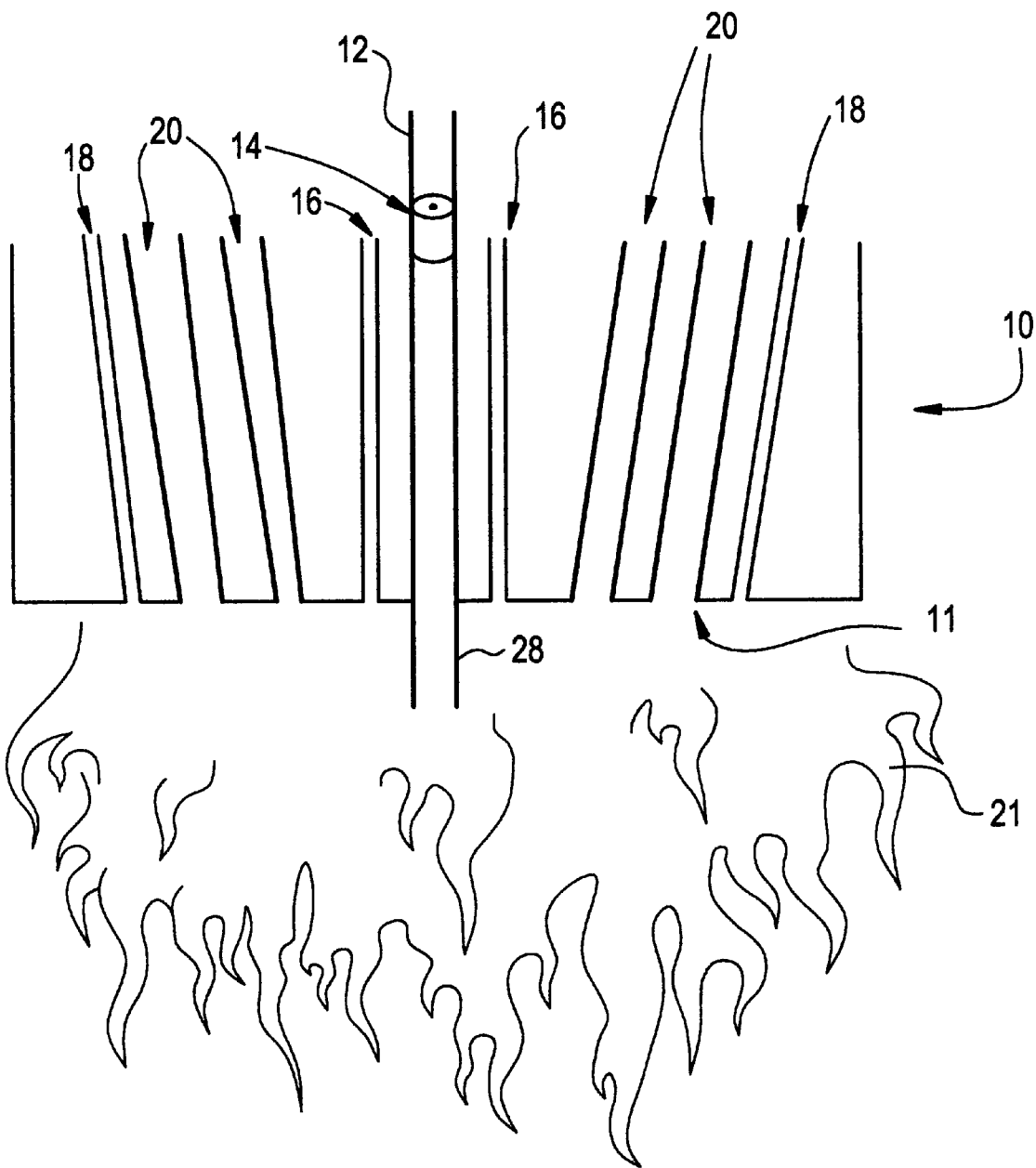
FIG. 1 is a schematic representation of a burner in accordance with the present invention.

Reference will now be made in detail to exemplary embodiments of the invention which are illustrated in the accompanying drawings. FIG. 1 schematically depicts a burner 10 having a burner face 11 for manufacturing silica-containing soot by combusting a liquid, silicon-containing feedstock and, optionally, dopant-providing compounds to a combustion site where the liquid siloxane feedstock is converted into silica.

The liquid, silicon-containing feedstock can be a siloxane feedstock such as a polymethylcyclosiloxane. In accordance with the invention, the preferably halide-free, silicon-containing reactant compound preferably comprises a polyalkylsiloxane, for example, hexamethyidisiloxane. More preferably, the polyalkylsiloxane comprises a polymethylcyclosiloxane. Most preferably, the polymethylcyclosiloxane is selected from the group consisting of hexamethylcyclotrisiloxane, octamethylcyclotetrasiloxane, decamethylcyclopentasiloxane, dodecamethylcyclohexasiloxane, and mixtures thereof. It will be understood, however, that alternative liquid feedstocks can be utilized. One example is silicon tetrachloride.

The feedstock can be contained in a feedstock tank that can be delivered to the burner 10 by a delivery system that can include a delivery conduit, a metering pump, and a filter, if desired (not shown). Referring now to FIG. 1, the liquid feedstock delivery conduit is in fluid communication with inlet 12. Inlet 12 is in fluid communication with atomizer 14, which is preferably located internally within the burner structure. However, the atomizer can be located at or proximate to the burner face 11 if desired. The atomizer 14 will be described in more detail below.

Preferably, the burner is conventionally provided with inner shield gas, outer shield gas, and a combustible gas for the flame, as described, for example, in U.S. Pat. No. 4,165,223 to D. R. Powers, which is relied upon and incorporated by reference. In one embodiment, the inner shield gas is an inert gas, such as nitrogen, and is delivered through burner channels 16. By inert gas, we mean a gaseous element such as nitrogen, argon, or helium, which is non-reactive under ordinary conditions. The outer shield gas can be delivered through burner channels 18. In one embodiment, the outer shield gas is oxygen. By combustible gas, we mean a gas that is typically used in the combustion of silica-containing precursors, such as methane, or a mixture of methane and oxygen. Combustible gas can be delivered through burner channels 20 to provide a burner flame 21.

It will be understood that FIG. 1 exemplifies one of several potential burner embodiments. The arrangement of different gas and fuel supplies surrounding the atomizer can vary. Due to the low turbulent nature of the effervescent liquid atomizer of the present invention, multiple atomizers can be placed in the burner. The use of multiple atomizers can dramatically increase the deposition rate of silica soot.

The atomizer used for the method and burner of the present invention can generally be described as an effervescent atomizer. As used herein, effervescent atomizers and effervescent atomization means mixing the liquid to be atomized with a gas in a mixing chamber to form a liquid-gas mixture before passing the mixture through an atomizing orifice. The liquid-gas mixture is then ejected in a stream from a discharge atomizing orifice. It is to be understood that effervescent atomization does not involve using the gas to impart kinetic energy to the liquid stream, as is the case for airblast atomizers.

The exact mechanism of effervescent atomization is not well understood. Without being bound to a particular principle of operation, it is believed that during effervescent atomization, it is believed that the liquid flowing through the orifice is squeezed by the gas bubbles into thin shreds and ligaments. When the gas bubbles emerge from the nozzle, they explode and shatter the surrounding liquid shreds and ligaments into small droplets. Effervescent atomizers and atomization can be further distinguished from airblast atomizers in that effervescent atomization is much less dependent on the size of the orifice than airblast atomization. This allows effervescent atomizers to contain much larger orifices than airblast atomizers, which helps reducing problems associated with plugging of the orifices. In one experiment, effective atomization was achieved by premixing the liquid reactant and a gas and ejecting the mixture out of atomizing orifices sized about 1/10 inches in diameter.

Figure 2:
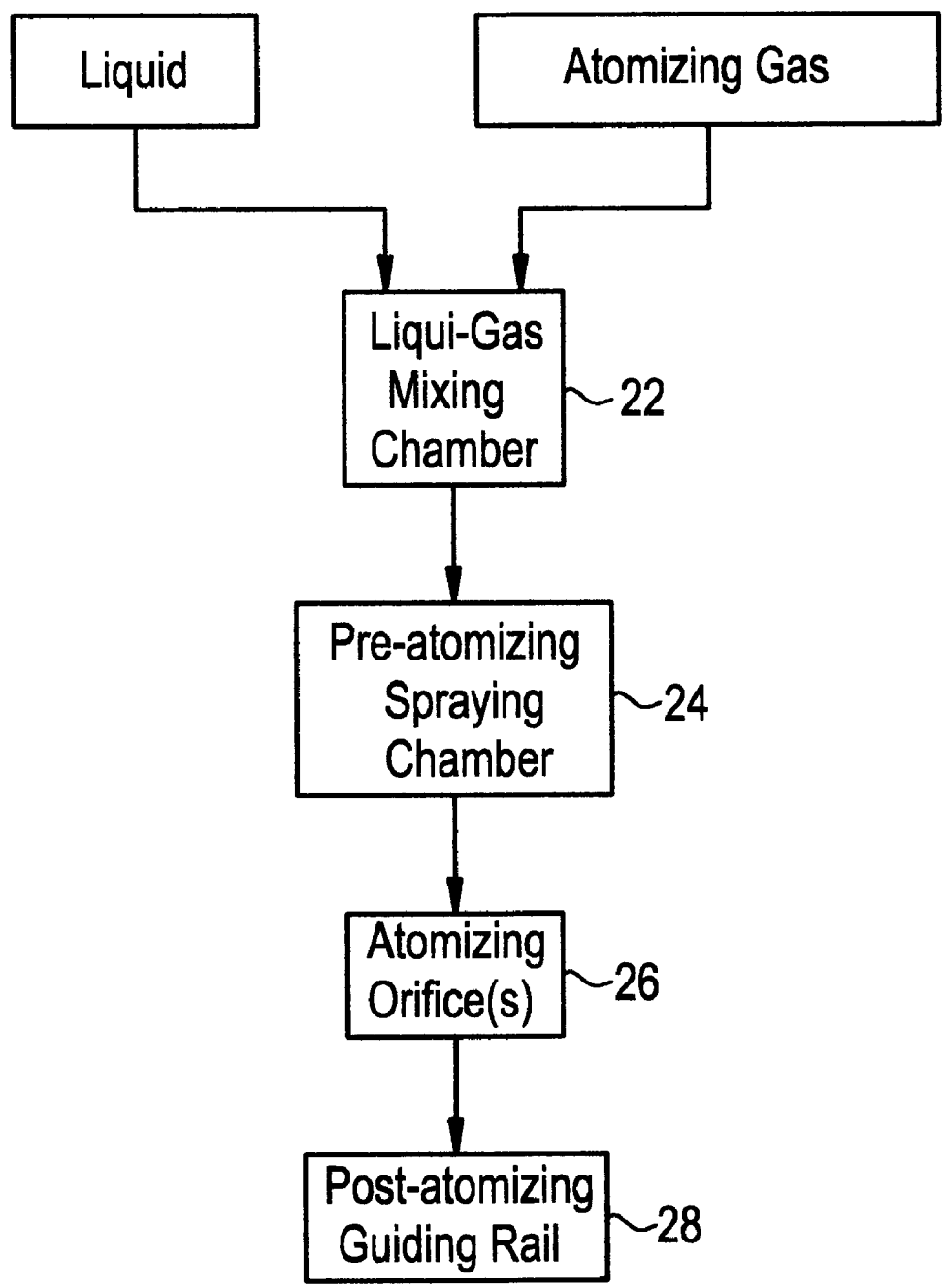
FIG. 2 is a flow diagram of an effervescent atomizer.
Figure 3:
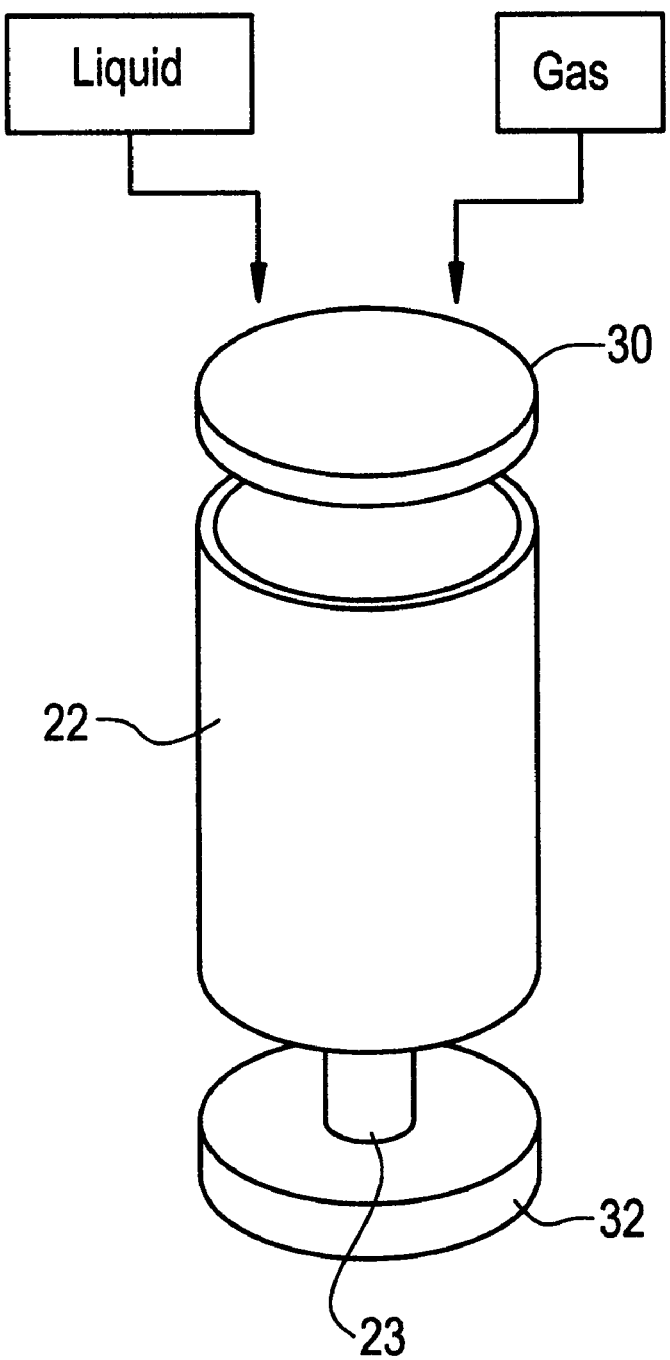
FIG. 3 is a schematic representation of one embodiment of a liquid-gas mixing chamber for an effervescent atomizer.

Referring now to FIGS. 2 and 3, an effervescent atomizer generally consists of the following parts. Liquid and gas are fed into a liquid-gas mixing chamber 22 having an optional orifice 23. The liquid-gas mixing chamber 22 is in fluid communication with an optional pre-atomizing spraying chamber 24, in fluid communication with at least one atomizing orifice 26. It will be understood that the pre-atomizing spraying chamber 24 together with the optional orifice 23 in the mixing chamber 22 can be eliminated. In accordance with one embodiment of the present invention, the effervescent atomizer also includes a post-atomizing guiding rail 28 to direct the atomized liquid reactant into the burner flame 21, as shown in FIG. 1.

Depending on the liquid feeding rate, the size of the atomizer and the number of the orifices required, certain parts may not be necessary. For example, for miniature atomizers or atomizers with small number of orifices, the pre-atomizing spraying chamber can be eliminated; in cases when the requirement for reducing flame turbulence is not strict, the post-atomizing guiding rail can be eliminated.

FIG. 3 illustrates one embodiment of a liquid-gas mixing chamber 22, showing an enclosed chamber in which the liquid and a gas are delivered and mixed. The chamber can consist of upper and lower portions 30 and 32, which, as shown in the figure can be detachable from the main body of the chamber, or can be made integral with the main body portion. While the embodiment shown in FIG. 3 depicts the liquid and gas entering the upper portion of the mixing chamber 22, it will be understood that the liquid and/or the gas can be introduced through a side wall or lower portion of the chamber. In one embodiment, the mixing chamber 22 contains an orifice 23 for delivering the gas-liquid mixture to an optional spraying chamber. The orifice 23 is preferably smaller than the diameter of the mixing chamber 22. When used in conjunction with an optional spraying chamber described below, the smaller opening spreads out or sprays the liquid for better liquid distribution. For smaller sized atomizers, or atomizers with a fewer number of orifices, the orifice 23 in the liquid-gas mixing chamber 22, and the spraying chamber 24 can be eliminated altogether.

Figure 4:
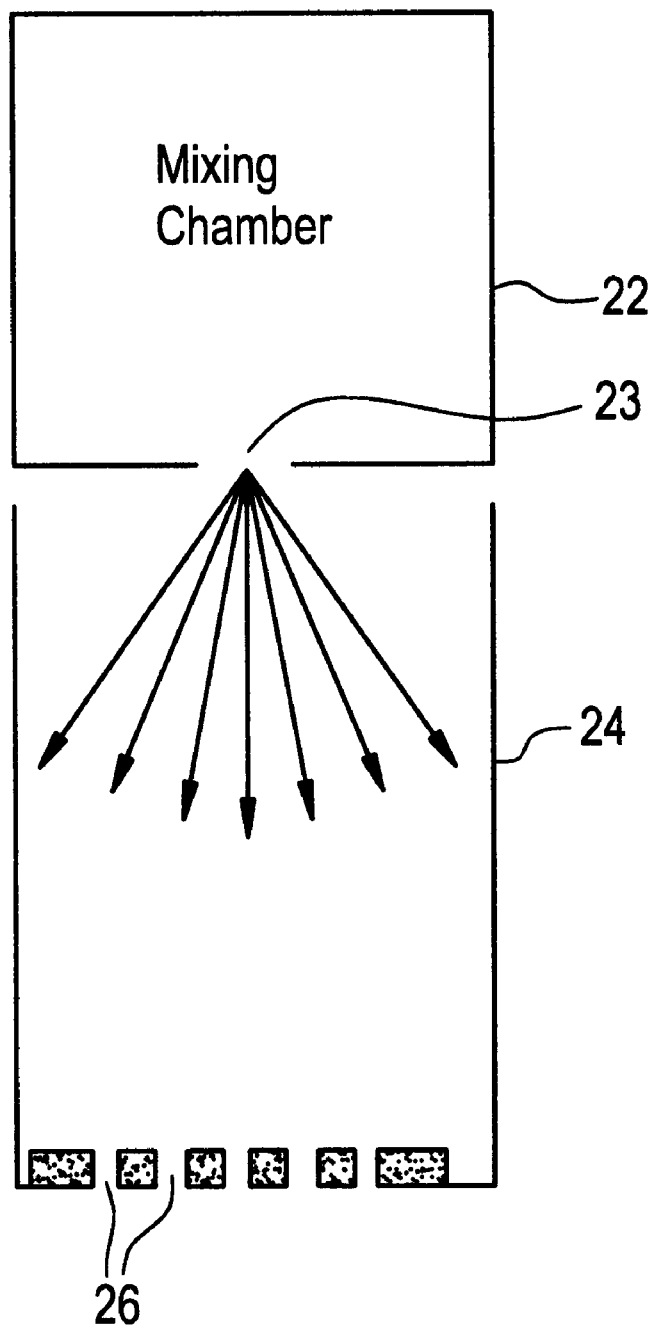
FIG. 4 is a representation of an optional spray chamber.

In an alternative embodiment shown in FIG. 4, an optional spray chamber can be located downstream from the liquid-gas mixing chamber. FIG. 4 shows the optional spray chamber 24 in fluid communication with a plurality of orifices 26. The plurality of orifices 26 in the spray chamber are sized to atomize the liquid feedstock. The orifice 23 in the liquid-gas mixing chamber 22 is sized to spray the liquid-gas mixture into the spray chamber 24. The spray chamber 24 provides sufficient space for liquid spray droplets to spread out when the liquid-gas mixture exits the orifice 23 at the bottom of the mixing chamber 22. As a result, better distribution of liquid across the multiple atomizing orifices 26 below can be achieved.

Figure 5A:
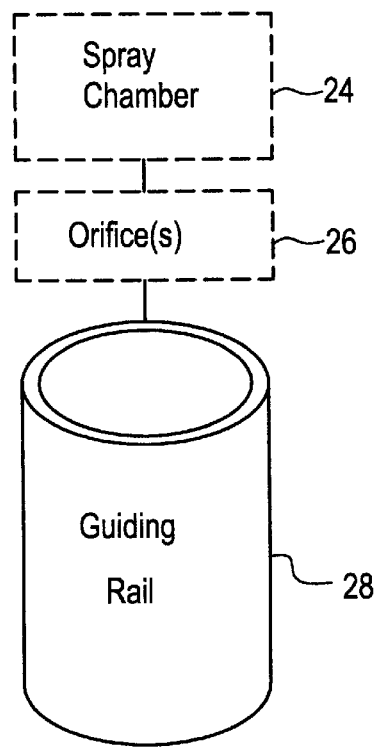
FIG. 5a–c shows a schematic representation of guiding rails.
Figure 5B:
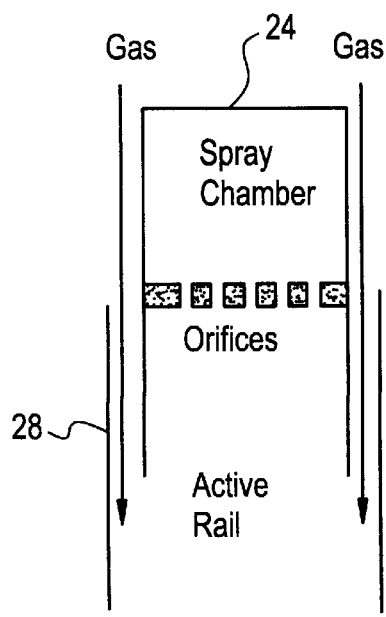
Figure 5C:
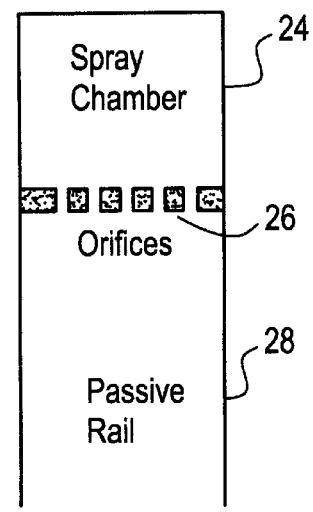

In another aspect of the invention shown in FIG. 5a, a guiding rail 28 is provided downstream from the orifices to direct the atomized liquid feedstock to the combustion site. FIG. 5b shows an "active" guiding rail, wherein a gas flow is introduced along the inner wall 40 of the guiding rail to prevent accumulation of atomized liquid on the inner wall of the rail. FIG. 5c shows a "passive" guiding rail, wherein no gas flow is required to prevent accumulation of atomized liquid on the wall of the guiding rail.

The purpose of the guiding rail 28 is to guide the atomized droplets into the combustion site. After exiting an orifice, the atomized liquid droplets can easily spread over an angle of more than 90 degrees. Excessive outward spreading of liquid droplets, can cause severe flame turbulence. A cylindrical guiding rail extending from the orifice can effectively restrict the outward spreading of liquid droplets and reduce the flame turbulence dramatically. A spread angle of less than 15 degrees can be easily achieved. The challenge associated with this practice is to prevent excessive segregation of atomized liquid droplets on the inside wall of the guiding rail., which tends to cause dripping. Dripping can be prevented with proper guiding rail design together with appropriate orifice construction.

When a portion of the droplets collect on the inner surface of the rail wall, they tend to segregate and form a liquid film. The shear generated by the flow of the atomized liquid tends to break liquid away from the film. The equilibrium between the two determines the liquid film thickness on the wall. Proper orifice design can result in sufficient flow in the region near the rail wall to limit the thickness of the liquid film formed. At the guiding rail exit, a thin liquid film can be re-atomized by shearing forces. Alternatively, the active rail design can be used to prevent the accumulation of liquid film and dripping.

The burners of the present invention can be utilized to collect the silica-containing soot on a rotatable mandrel (not shown) to form a soot blank or preform which may be used to fabricate an optical waveguide. In an alternative embodiment, silica soot may be collected for subsequent consolidation, or the silica soot may be collected in a collection chamber in which the soot is immediately consolidated into its desired shape (not shown). The burner and method of the present invention can be used to form pure silica soot, or silica-soot containing a dopant. The dopant can be made from a compound capable of being converted by oxidation or flame hydrolysis to the desired dopant material, for example, $P_2O_5$ or a metal oxide whose metallic component is selected from Groups IA, IB, IIA, IIB, IIIA, IIIB, IVA, IVB, VA, and the rare earth series of the Periodic Table. These oxide dopants combine with the silica generated in the burner to provide doped silica glass, which can be subsequently formed into optical waveguide fibers, or other multicomponent glasses such as Uhra low expansion glasses.

The invention has been described in detail for the purpose of illustration, but it is understood that such detail is solely for that purpose and variations can be made therein by those skilled in the art without departing from the spirit and scope of the invention, which is defined by the following claims.

We claim:

1. A method of manufacturing silica-containing soot comprising the steps of:
   feeding a liquid, silicon-containing feedstock and a gas into a mixing chamber,
   mixing the liquid feedstock and the gas in the mixing chamber to provide a liquid-gas mixture,
   feeding the liquid-gas mixture into a spray chamber through an opening smaller than the spray chamber cross-section,
   delivering the liquid-gas mixture to at least one orifice for ejection into a combustion site,
   subjecting the mixture to effervescent atomization as it passes through the at least one orifice, and
   converting the silicon-containing feedstock into a silica-containing soot proximate the combustion site.

2. The method of claim 1, further comprising the steps of atomizing the liquid-gas mixture during the subjecting step and providing a guiding rail to direct the atomized liquid-gas mixture into the combustion site.

3. The method of claim 1, wherein the silica-containing soot contains a dopant.

4. The method of claim 1, wherein the combustion site is a flame produced by a combustion burner.

5. The method of claim 4, further comprising the step of depositing the silica-containing soot onto a rotating mandrel.

6. The method of claim 1, further comprising the step of depositing and simultaneously sintering the silica containing soot in a containment vessel to form a silica-containing body.

7. The method of claim 3, wherein the dopant contains at least one member of a group consisting of $P_2O_5$ and a metal oxide having a metallic component selected from Groups IA, IB, IIA, IIB, IIIA, IIIB, IVA, IVB, VA, and the rare earth series of the Periodic Table of Elements.

8. The method of claim 1, wherein the mixing step comprises flowing the liquid silicon-containing feedstock into the mixing chamber and flowing the gas into the mixing chamber under pressure.

9. The method of claim 1, wherein the gas is oxygen.

10. The method of claim 8, wherein the silicon-containing feedstock is a siloxane.

11. A method in accordance with claim 1 wherein the spray chamber has a plurality of atomizing orifices.

12. A burner for producing a silica-containing soot comprising:
    a plurality of channels for delivering gases, including a gas to provide a flame, to a combustion site,
    an effervescent atomizer system for atomizing a liquid, silicon-containing feedstock and delivering it to the combustion site, and
    the plurality of gas-providing channels surrounding the effervescent atomizer,
    wherein the effervescent atomizer comprises:
    a gas inlet for receiving a gas supply;
    a liquid inlet for receiving for receiving the liquid, silicon-containing feedstock;
    a mixing chamber for mixing the liquid, silicon-containing feedstock and a gas to provide a liquid-gas mixture;
    a spray chamber into which the liquid-gas mixture is fed before being ejected from an orifice; and
    an orifice for ejecting the liquid-gas mixture.

13. A burner in accordance with claim 12 further comprising a rail for guiding the atomized liquid, silicon-containing feedstock into the combustion site.

14. A burner in accordance with claim 12 wherein the spray chamber has a plurality of orifices from which the liquid-gas mixture is ejected.

* * * * *